United States Patent Office 3,740,258
Patented June 19, 1973

3,740,258
RESINOUS ENCLOSURE MEMBERS RENDERED IMPERMEABLE BY SULFONATION
Wilhelm E. Walles, Midland, Mich., assignor to The Dow Chemical Company, Midland, Mich.
No Drawing. Continuation-in-part of applications Ser. No. 696,702, Jan. 10, 1968, and Ser. No. 770,848, Oct. 25, 1968. This application Apr. 12, 1971, Ser. No. 133,376
The portion of the term of the patent subsequent to Oct. 19, 1988, has been disclaimed
Int. Cl. B44d 1/02
U.S. Cl. 117—94
37 Claims

ABSTRACT OF THE DISCLOSURE

Resinous enclosure members surface sulfonated to a degree such that from about 0.015 to about 50.0 milligrams of sulfur trioxide equivalents reside on a square centimeter of surface thereof effectively contain hydrocarbons and other organic materials. The sulfonated enclosure members are rendered substantially impervious to the penetration of various solvents and vapors by this degree of surface sulfonation. As a result of such treatment, these enclosure members are useful to hold, retain, or transport hydrocarbon solvents, perfumes, fuels, etc., and thus can be used as gasoline tanks, perfume bottles, plastic hoses, industrial containers, and the like.

CROSS REFERENCES TO RELATED APPLICATIONS

This is a continuation-in-part of Ser. No. 696,702 filed on Jan. 10, 1968, now abandoned and a continuation-in-part of Ser. No. 770,848 filed Oct. 25, 1968, now U.S. Pat. No. 3,613,957.

BACKGROUND OF THE INVENTION

This invention relates to resinous enclosure members which have been rendered impermeable by sulfonation.

It is known to provide barrier properties for various plastic substrates such as polyethylene by coating the substrate with various synthetic resinous coatings. See for example U.S. Pats. 2,836,319; 2,979,422; 2,985,542; 3,199,701; 3,279,940; 3,282,729 and 3,294,577. It is further known to provide an inorganic chemical treatment of the plastic substrates to provide barrier properties, e.g., U.S. Pat. 2,811,468, and to provide resistance to various materials, e.g., U.S. Pat. 2,446,536.

It is well known to sulfonate the surface of various plastic substrates to enhance the adhesion of coatings, dyes, etc. See for example, 2,400,720; 2,786,780; 2,786,783; 2,832,697; 2,832,698, 2,832,699; 2,858,237; 2,979,177 and 2,937,066.

SUMMARY OF THE INVENTION

Surprisingly, it now has been discovered that enclosure members fabricated of non-aromatic, hydrocarbon polymers which enclosure members contain from about 0.015 to about 50 milligrams of sulfur trioxide equivalent per square centimeter are substantially impermeable to lower molecular weight substances which normally permeate untreated and/or unmodified non-aromatic hydrocarbon polymers.

This invention has great practical utility since, by following the teachings of this invention, it is possible to make substantially impermeable containers out of the relatively cheap, flexible, non-aromatic, plastics such as polyethylene, polypropylene, etc. Thus, by using this invention it is possible to make plastic gasoline tanks for automotive vehicles; plastic containers for hydrocarbons and other organic materials which permeate untreated non-aromatic polymers; plastic aerosol cans for holding such diverse items as whipping cream, starch, insecticides, perfume, etc.; plastic films to lay on the ground and retain fumigants applied to the ground thereunder; plastic hoses for transferring liquid fuels and solvents such as gasoline, dry cleaning solvents, kerosene, etc., plastic pipes for the transportation of natural gas; and plastic face-pieces for gas masks that are both cheap and effective to keep out noxious gases and aerosols.

An especially preferred embodiment of this invention wherein great utility is achieved comprises a surface sulfonated enclosure member specified hereinbefore containing a hydrocarbon fluid such as gasoline, kerosene, diesel fuel and other similar fuels. In such embodiment, the enclosure member preferably exists in the form of a molded container such as a gasoline tank, oil drum or barrel and the like.

The surface of the enclosure member containing the hereinbefore specified concentration of sulfonate groups has a black or brown surface in which the sulfonated layer is strongly bonded to the non-sulfonated portion of the polymer. The plastic retains its inherent flexibility, and under preferred conditions of sulfonation, the sulfonated layer does not chip or crack off during flexure. Likewise, the sulfonated layer generally cannot be scratched off by a sharp edge or abraded.

DETAILED DESCRIPTION OF THE PREFERRED EMBODIMENTS

In its most preferred aspects, the present invention is a substantially closed, surface sulfonated container composed of the non-aromatic, hydrocarbon polymer and a predominantly hydrocarbon material contained therein. The container has an inner and an outer surface wherein at least one of said surfaces, preferably the inner surface, has a portion of hydrogen atoms of the polymer replaced by sulfonate groups. In the preferred embodiments, the sulfonate groups are present in said surface or surfaces in concentration of about 0.06 to about 20 milligrams (mg.) of sulfur trioxide equivalents per square centimeter, especially from about 0.1 to about 1 mg. of sulfur trioxide equivalent per square centimeter. Particularly contemplated in these most preferred embodiments are gasoline or similar fuel tanks for automotive vehicles and gasoline or liquid hydrocarbon fuel operated machinery in general; fuel barrels, drums and tanks of virtually all sizes; lubricating oil drums, tanks and cans; lubricating grease cans and barrels; containers for storing ingredients which are conventionally dissolved or dispersed in hydrocarbon fluid or diluted with hydrocarbon fluid, e.g., insecticides, herbicides, catalysts, paints and the like; and containers for predominately hydrocarbon monomers. In broader aspect, the present invention is an enclosure member composed of non-aromatic organic polymer wherein the polymer of at least one of the inner or outer surface of said member has a portion of its hydrogen atoms replaced by sulfonate groups such that the concentration of said sulfonate groups is in the range of from about 0.015 to about 50 mg. of sulfur trioxide equivalents per square centimeter.

In said broader aspect, the enclosure member is designed to be generic to bottles, boxes, tanks, barrels, bags, envelopes, films, flexible liners for more rigid structures, e.g., barrels, cans and drums of steel, tin, and other metals and rigid materials, parts such as films and shaped articles for fabrication of such enclosure members, and other containers having at least a portion of a wall member composed of non-aromatic polymer having one or more of its surfaces sulfonated in accordance with this invention. Accordingly, in such broader aspect, the enclosure member can be bottles or similar containers for perfume; containers for volatile fluids such as halogenated lower hydrocarbons, methane, ethane, propane and butane; containers for latex paints; plastic aerosol cans for holding such diverse items as whipping cream, starch, insecticides, herbicides, other poisons, perfume, and the like; plastic films to lay on the ground and retain fumigant such as methyl bromide applied to the ground thereunder; plastic hoses and pipes for transferring liquid and gaseous fuels such as gasoline, diesel oil, kerosene, methane, ethane, propane and butane and other organic fluids such as dry cleaning solvents and lubricating oils; and plastic face-pieces for gas masks that are both cheap and effective to keep out noxious gases and aerosols.

The polymers of the enclosure members which can be sulfonated in accordance with this invention are preferably thermoplastic, non-aromatic, hydrocarbon polymers which have a linear carbon-to-carbon backbone molecular structure with only non-aromatic substitutents and have a plurality of free hydrogen atoms attached to the carbon atoms of the polymer chain. These polymers are extended or molded to form the enclosure members. Examples of these thermoplastic extrusion grade or moldable grade non-aromatic hydrocarbon polymers are homopolymers of ethylene, propylene, isobutylene, methyl-pentene-1, butene-1, vinyl chloride, vinylidene chloride, acrylonitriles, interpolymers of the foregoing monomers with each other, chlorinated polyethylene and chlorinated polypropylene, and blends of the foregoing monomers and copolymers. Of particular interest are the high and low density polyethylene, polypropylene, ethylene/propylene copolymers, ethylene/butene-1 copolymers and blends thereof.

Prior to the actual molding or extrusion operation, the aforementioned moldable polymers can be mixed with the usual antioxidants, pigments, dyes, or extenders known to the art without impairing the subsequent sulfonation step since the latter is a surface treatment.

It is to be understood that the most preferred range of sulfonation to be used will be somewhat dependent upon the material which is to be retained in the enclosure member and the particular polymer being sulfonated. As an example, a gasoline container or gas tank fabricated of polyethylene requires a range of sulfonation from 0.06 to 50 mg. $SO_3$ (sulfur trioxide equivalents) per cm.$^2$, preferably from 0.06 to 10 mg. $SO_3$ per cm.$^2$, especially from about 0.1 to about 1 mg. $SO_3$ per cm.$^2$. If one desires to make a plastic dispenser wherein methylene chloride or one of the halogenated lower hydrocarbons is to be retained therein, the degree of sulfonation is preferably higher, i.e., in the range from about 1.5 to 20 mg. $SO_3$ per cm.$^2$. On the other hand, when the gas tank is fabricated of polypropylene, a degree of sulfonation as low as 0.015 mg. $SO_3$ per cm.$^2$ gives effective barrier to gasoline, and degree of sulfonation of 0.03 to 10 mg. $SO_3$ per cm.$^2$ is preferred. It is also found that degree of sulfonation desired to produce useful barrier varies somewhat with degree of crystallinity of the polymer. As a rule, a polymer having a higher degree of crystallinity requires a generally higher degree of sulfonation to produce barrier properties equivalent to those of a polymer having lower degree of crystallinity. It is further found that it is desirable to employ polymers having little or no very low molecular weight fraction in order to avoid cracking and flaking away of the sulfonated surface.

While the nature of the sulfonating process appears to be quite complex and theories as to how the reaction proceeds have only fair conclusiveness, it now seems that the reaction appears to be one of simultaneous oxidation and sulfonation. The black or dark brown color associated with the barrier layer thus appears to be the result of a complex oxidation of the polymer so that it contains various oxidized groups such as hydroxy, keto, and carboxylic acid groups. It is further believed that these groups condense with one another to form the chromophoric groups responsible for the dark color above noted.

It is to be understood that some polymers have a propensity to darken with sulfonation more than others. For example, polyethylene becomes brown with a moderate degree of sulfonation but the use of a low temperature reduces this tendency somewhat. On the other hand, polyvinyl chloride is very resistant to coloration upon sulfonation. For these reasons it is more accurate to define the degree of sulfonation required in terms of milligrams of sulfur trioxide equivalents per square centimeter rather than by the color of the sulfonated polymer.

It is sometimes desirable to remove or reduce this color due to sulfonation as in the case of plastic aerosol cans to hold starch, insecticides or perfumes which are to be sold to the consumer. This is accomplished by bleaching with a bleaching agent such as aqueous solutions of sodium hypochlorite or hydrogen peroxide.

The surfaces of these sulfonated plastics have been analyzed by standard analytical methods, e.g., oxygen bomb combustion followed by reduction to hydrogen sulfide which is titrated with caustic soda and mercury acetate, and by neutron activation analysis. From infrared spectroscopical studies, it is clear that substantially all sulfur is present in the form of

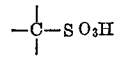

with only a trace of sulfate. It appears from these studies that the sulfonated polymer units are interspersed with 0–500 units of the unsulfonated polymer unit. This can be illustrated by the following formula:

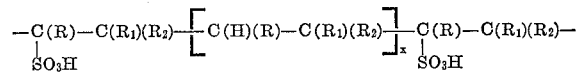

where $x$ is 0–500.

$R$, $R_1$, $R_2$, are selected from hydrogen, chlorine, alkyl, etc., groups.

A preferred method of sulfonating the plastic substrate of which the enclosure member is composed is to expose such substrate to gaseous sulfur trioxide, preferably diluted with a dry inert gas such as air, nitrogen, helium, carbon dioxide, sulfur dioxide and the like. The concentration of sulfur trioxide in the gaseous sulfonating agent can vary from about 0.1 to 100 volume percent base on total gaseous sulfonating agent, preferably from about 15 to about 25 volume percent of sulfur trioxide. The foregoing volume concentrations correspond to about 0.003 to about 3 grams of sulfur trioxide per liter (at atmospheric pressure) for the range of 0.1 to 100 volume percent and about 0.45 to about 0.75 gram of sulfur trioxide per liter for the range of 15 to 25 volume percent. The time of sulfonation required to produce acceptable degree of sulfonation varies with the concentration of sulfur trioxide and the temperature. For example, at room temperature ($\sim25°$ C.), 2 volume percent sulfur trioxide requires 15 to 20 minutes to give the desired degree of sulfonation whereas 18 volume percent sulfur trioxide requires only 2–3 minutes. At temperature of 35° C., the time required when using 18 volume percent sulfur trioxide is shortened to 1–2 minutes. As evidenced by the foregoing, the time and concentration of sulfur trioxide are inversely related, thus any combination of the above variables may be used to suit specific needs. It is important to exclude water vapor from the above gases by a conventional drier tube since in the presence of water in a liquid or vapor form, the sulfur trioxide is converted to droplets of sulfuric acid of a varying concentration and the sulfonation of the plastic is either inhibited or prevented.

Another method of sulfonating the plastic substrates is to use a 10% by weight solution of $SO_3$ in an inert liquid solvent, such as a liquid polychlorinated aliphatic hydrocarbon. Examples of liquid polychlorinated aliphatic hydrocarbons coming within the purview of this invention are methylene chloride, carbon tetrachloride, perchloroethylene, symtetrachloroethane and ethylene dichloride. However, other concentrations may be used, for example, from about 1% to about 25% by weight $SO_3$ in an inert solvent. It has been found that 8 minutes contact with 1% $SO_3$ in methylene chloride gives a dark brown plastic substrate which is a substantial vapor barrier to organic solvents and vapors. This range has been found to extend to as much as 30 minutes contact with a 9% by weight solution of $SO_3$ in methylene chloride. The latter sulfonation reagent sulfonates these plastic substrates to a very black color. It is, of course, to be understood that the time and concentration are inversely related and that any range within these two extremes may be used. Thus, a more concentrated solution of $SO_3$ may be used for a shorter contact time or a less concentrated solution for a longer contact time.

Although temperature is not critical in practicing the foregoing methods of sulfonation, it is generally advantageous to carry out said methods at temperatures in the range of from about $-20°$ to about $60°$ C., preferably from about $20°$ to $40°$ C.

The pressure at which the sulfonation is carried out can be atmospheric or super atmospheric. Because of the convenience, it is preferred to carry out the sulfonation at atmospheric pressure. However, the reaction can also be carried out at a pressure of 1 to 10 pounds per square inch gage (p.s.i.g.).

While the foregoing methods are preferable, this invention is not limited to enclosure members which are sulfonated by any particular technique. Therefore, any method of sulfonating plastic material which will give the hereinbefore specified degree of sulfonation is suitable for the purpose of this invention.

In the practice of this invention, the degree of sulfonation is necessarily at least 0.015 mg. of sulfur trioxide equivalents per square centimeter of plastic substrate. At degrees of sulfonation below this level, the desired barrier properties are not achieved. It should be noted that in the case of polyethylene the degree of sulfonation should be greater than 0.03 mg. per square centimeter. In fact with polyethylene at sulfonation levels from about 0.04 to about 0.06 mg. of sulfonate groups per square centimeter, barrier properties are obtained but at reduced levels as compared to those obtained with concentration of 0.06 milligram of sulfur trioxide equivalents per square centimeter or higher. Generally, a degree of sulfonation of 1 milligram of sulfur trioxide equivalent provides about as much barrier to most hydrocarbon fuels such as gasoline as degrees of sulfonation which are greater than 1 mg. $SO_3$ per square centimeter. When the polymer substrate is sulfonated to concentrations higher than about 50 milligrams of sulfur trioxide equivalents per square centimeter, the substrate generally exhibits a substantial loss in tensile strength.

For the purposes of this invention, the materials advantageously contained by or excluded from the hereinbefore described surface sulfonated enclosure members are materials which normally permeate the walls of shaped articles of the non-aromatic thermoplastic polymer. Such material which permeates said polymers include organic materials hereinafter referred to as "organic penetrants" and inorganic gaseous materials such as oxygen, nitrogen, air, carbon dioxide, helium and hydrogen. The materials which permeate the non-aromatic thermoplastic are generally of relative low molecular weight, e.g., less than about 2,000. In order to more clearly define what is meant by a material which permeates a polymer, a material is normally considered to permeate a polymer if the material passes through a mil-thick wall of the polymer at a rate of 0.1 microgram per day per square centimeter of wall or more.

Organic penetrants which are preferably contained by the sulfonated enclosure members of the present invention are generally low molecular weight materials including saturated aliphatic hydrocarbons such as the paraffins, e.g., methane, ethane, propane, butane, pentane, hexane, heptane, octane, nonane, decane, dodecane and the like; the naphthas derived from petroleum including gasoline and kerosene; naphthas derived from coal tars; lubricating oils and greases, fuel oils including diesel oil, cycloalkanes such as cyclohexane, cycloheptane and cyclooctane; unsaturated aliphatic hydrocarbons such as the monoolefins, e.g., ethylene, propylene, butene-1, methylpentene-1 and hexene-1, diolefins, e.g., butadiene and isoprene, and alkynes such as acetylene and methylacetylene; aromatic hydrocarbons, e.g., benzene, toluene, xylene, naphthalene and anthracene; alkenyl aromatic hydrocarbons, e.g., styrene, vinyltoluene, t-butylstyrene, divinylbenzene, α-methylstyrene; halogenated aliphatic hydrocarbons and solvents, e.g., methyl chloride, methylbromide, methylene chloride, chloroform, bromoform, carbon tetrachloride, carbon tetrabromide, methylchloroform, ethyl chloride, 1,1-dichloroethane, 1,2-dichloroethane, 1,1,2 - trichloroethane, 1,1,1,2 - tetrachloroethane, 1,1,2,2-tetrachloroethane, pentachloroethane, hexachloroethane, methylenechlorobromide, propylene dichloride, 1,1,2,2-tetrachloro-1,2 - difluoroethane, 1,1,2-trichloro-1,2,2-trifluoroethane, 1,2-dibromo-1,1,2,2-tetrafluoroethane, carbon trichlorofluoride, dichlorofluoromethane, octafluorocyclobutane, 1,2-dichloro-1,1,2,2 - tetrafluoroethane, carbon tetrafluoride, trifluoromethane, carbon dichloro-difluoride, chloropentafluoroethane, chlorodifluoromethane, bromotrifluoromethane, hexafluoroethane, 1,1,1-chlorodifluoroethane and 1,1-difluoroethane; halogenated unsaturated aliphatic compounds, e.g., vinyl chloride, vinylidene chloride, trichloroethylene, perchloroethylene, 1,2,3-trichloropropene, allyl chloride, vinyl bromide, allyl bromide, vinyl fluoride and vinylidene fluoride; halogenated aromatic hydrocarbons, e.g., chlorobenzene, bromobenzene, chlorotoluene, benzyl chloride, benzyl bromide, chloronaphthalene, dichlorobenzene and trichlorobenzene; and halogenated alkenyl aromatic hydrocarbons, e.g., chlorostyrene, bromostyrene, dichlorostyrene, and vinyl benzyl chloride. Materials which are also advantageously contained are hydrocarbon solutions of herbicides such as 2-hydroxy-3,5-dinitro-(5-butyl)benzene, 2,4-dichloro-phenoxyacetic acid, and 2,4,5-trichlorophenoxyacetic acid; insecticides such as O,O-diethyl O-3,5,6-trichloro-2-pyridyl phosphorothioate, O,O-dimethyl O-2,4,5-trichloro-phenyl phosphorothioate and 4 - dimethylamino - 3,5-xylyl methylcarbamate; perfume compositions containing synthetic aromatic materials such as citrus oils, clove oils, eugenol, isoeugenol, ionones, orange oils, lemon oils and the like; aerosols containing nitrous oxide or the halogenated lower alkanes as propellants; mineral oils; vegetable oils, e.g., corn oil, peanut oil, and other oleaginous foodstuffs; natural isolates (fractions derived from natural sources, e.g., aromatic woods, barks, branches, flowers and fruits); perishable materials deleteriously affected by atmospheric gases such as oxygen, air, and carbon dioxide; lower alkanols, e.g., methanol, ethanol, 1-propanol, isopropyl alcohol, 1-butanol, sec-butyl alcohol.

The following examples and comparative data show the surprising improvement in impermeability of the plastic substrates effected by the present invention. All parts and percentages are by weight unless otherwise indicated.

EXAMPLE 1

Four commercial 500 cc. high density polyethylene cylindrical bottles with screw caps (0.960 density; 0.6–0.8 melt index) as determined by ASTM D–1238–65T condition E are divided into two groups of two. Into the first group is poured a solution of 2% by weight of $SO_3$ dissolved in methylene chloride sufficient to substantially fill the bottles. The caps are screwed on tight and the filled bottles are rotated slowly on their sides at 25° C. for about six minutes. The bottles are then emptied, rinsed with deionized water and dried. Next the bottles are filled with 370 grams of commercial grade regular gasoline and placed in a ventilated hood for observation.

The second group is given the same treatment except that the $SO_3$ is omitted from the methylene dichloride.

It is found that the sulfonated polyethylene bottles (the first group) have an increased barrier effect and the weight loss of gasoline is greatly reduced as compared to the untreated group (the second group).

EXAMPLE 2

Four commercial six ounce cylindrical bottles with screw caps, blow molded from a 60–65 percent crystalline polypropylene having a melt flow of 1.0 (ASTM D–1238–65T, Condition L) are divided into two groups of two. In to the first group is poured a solution of 1% by weight of $SO_3$ dissolved in methylene chloride sufficient to substantially fill the bottles. The caps are screwed on tight and the filled bottles are rotated slowly on their sides at 35° C. for 5 minutes. Following this the bottles are emptied, rinsed with deionized water and dried. Into the first group of bottles are then poured 375 grams of commercial grade regular gasoline and placed in a ventilated hood for observation.

The second group is then given exactly the same treatment except that the $SO_3$ is omitted from the methylene dichloride solvent.

It is observed that the treated (sulfonated) first group have a greatly reduced weight loss of gasoline over a period of days as compared to the second (untreated) group.

EXAMPLES 3–6

Three commercial 500 cc. high density polyethylene bottles with screw caps were substantially filled with 2% by weight of $SO_3$ dissolved in methylene chloride. The caps were then screwed on tight and the bottles were sulfonated at 25° C. in the manner as set forth in Examples 1 and 2 for a period of time set forth in the following table. A fourth bottle was used as the control and given the same treatment except no $SO_3$ was used. Following the sulfonation the bottles were emptied and thoroughly washed with deionized water and dried. They were then filled with 378 grams of commercial grade regular gasoline, sealed, and placed in a ventilated hood for 4 days. Each bottle was carefully sniffed to detect the odor of gasoline. The results of these experiments are set forth in Table I.

TABLE I

| Ex. | Sulfonation | Color of P.E. surface | Cumulative weight loss in grams | | | | Average weight loss rate, gm./day | Gasoline odor |
|---|---|---|---|---|---|---|---|---|
| | | | 1 day | 2 days | 3 days | 4 days | | |
| 3 | None, control | Clear | 1.7 | 5.2 | 10.1 | 15.1 | 3.78 | Very strong. |
| 4 | 2 minutes | Brown | 1.0 | 3.9 | 7.5 | 11.5 | 2.87 | Strong. |
| 5 | 6 minutes | Dark brown | 0.9 | 3.7 | 7.4 | 11.2 | 2.8 | Faint. |
| 6 | 15 minutes | Black | 0.1 | 0.1 | 0.1 | 0.2 | 0.05 | None. |

From the above data it will be noted that the untreated control lost more than 75 times more weight of gasoline than the most thoroughly sulfonated bottle. Another way of summarizing the results is to say that there was a reduction of the rate of loss of the gasoline by a factor of 75.

EXAMLES 7–9

In a manner similar to Examples 1–2, two 500 cc. low density polyethylene bottles were surface sulfonated at 35° C. with 1.0% $SO_3$ solution in methylene dichloride, washed and filled with gasoline. The rate of loss of gasoline was determined over a period of 14 days. The results are shown below:

TABLE II

| | Sulfonation time | Color | Weight loss rate, gm./day |
|---|---|---|---|
| Example: | | | |
| 7 | None (control) | Clear | 4.1 |
| 8 | 3 minutes | Black | 0.07 |
| 9 | 15 minutes | do | 0.007 |

From the above data, it will be noted that the rate of weight loss was reduced by factors of up to 600.

EXAMPLE 10

Four experimental gasoline tanks are fabricated from rectangular sheets of ⅛ inch thick polypropylene (melt flow 1.0 ASTM D–1238–65T condition L; 60–65% crystallinity) the tanks were made up by heating and bending a sheet of the polypropylene into a substantially U shaped channel. The open channel is then sealed on to a flat piece of the same polypropylene to form a closed U shaped cylinder. The ends are sealed in a similar manner to form a tank of about 12 gallons liquid capacity. The tanks are then provided with a sealable inlet opening.

Into three of these tanks are poured two gallons of methylene chloride to which had been added 1% by weight of sulfur trioxide. Into the fourth tank is poured the same amount of methylene chloride without the sulfur trioxide. The tanks are then sealed and agitated vigorously at 25° C. for various times, i.e., one minute for tank #1, two minues for tank #2, fifteen minutes for tank #3 and fifteen minutes for tank #4 (the control).

Following this treatment the tanks are emptied and thoroughly washed on the inside with deionized water and dried.

Each tank is then filled with eleven gallons of regular grade gasoline, sealed, weighed, and placed in a ventilated hood for 20 days. It is found upon weighing that results similar to Examples 3–6 are obtained. By similar results is meant that the tank subjected to the sulfonation conditions for the longest period, i.e., fifteen minutes for tank #3, exhibited the lowest loss rate per day and tanks #1 and #2 exhibited lower loss rates than the control.

EXAMPLE 11

Four additional tanks are made up and three of these sulfonated in a manner as set forth in Example 10. The outside of these three sulfonated tanks are then sulfonated in a sulfonating bath of 1% sulfur trioxide in methylene chloride by rotating the outside surfaces of the tanks in the bath for a period of two minutes at about 25° C. and washed with water.

It is found that when these double sulfonated tanks are tested in the same manner as in Example 10 that a still further reduction in the weight loss of gasoline is obtained.

EXAMPLE 12

Three 4-fluid ounce capacity screw-capped Boston Round bottles molded from medium low molecular weight polyvinyl chloride (weight average molecular weight of approximately 93,000) containing 16% by weight of a proprietary impact modifier are filled with a solution of 1% by weight of $SO_3$ dissolved in methylene chloride. The caps are then screwed on and the bottles are rotated slowly at 25° C. for varying periods of time. The first bottle is treated for 1 minute, the second bottle is treated for 5 minutes, and the third bottle for 20 minutes.

A fourth bottle is given the same treatment for 20 minutes only without the $SO_3$ being present.

After the rotational treatment, the treated bottles are drained and rinsed with deionized water and dried.

All four bottles are then substantially filled with 150 grams of Freon 11 (trichloromonofluoromethane) and placed in a ventilated hood for a period of 20 days.

It is found that with periodic weighings during and at the end of this time period that the bottle sulfonated the longest period has the least weight loss and that all the sulfonated bottles are greatly superior to the untreated control in weight loss.

EXAMPLE 13

A series of blow molded polyethylene bottles, (16-ounce capacity), said polyethylene having a density of 0.928 gm./cc. and a melt index (190° C., 2.16 kg.) of 1.10 dg./min., were treated for various times at various temperatures with various sulfonation agents as set forth below in Table III. The bottles were thereafter partially filled with 100 cc. of a commercial grade regular gasoline. The bottles containing the gasoline were sealed, carefully weighed, and stored at 25° C. for a period of 5 and 9 days with carefully reweighing at the end of each time period and the average weight loss of each is given in Table I.

A similar series of identical blow molded polyethylene bottles were treated with sulfonation agents exactly as above and a two-inch square piece was cut out of the one millimeter thick side wall of each bottle and the square pieces were combustion analyzed for bulk sulfur content which is given in Table III.

For purposes of showing the criticality of the degree of sulfonation required to provide barrier, several runs ($A_1$–$A_5$) were carried out employing degrees of sulfonation less than 0.015 mg. $SO_3$ per cm.$^2$. In addition a control run ($C_1$) was carried out wherein the polyethylene bottle was not sulfonated. The results of these runs are also recorded in Table III on the following page.

commercial grade regular gasoline. The bottles containing the gasoline were sealed, carefully weighed, and stored at 25° C. for periods of 13, 47 and 136 hours with careful reweighing at end of each time period. The average weight loss after 136 hours is given in Table IV. A similar series of polypropylene bottles were treated with sulfonation agent exactly as above and analyzed for bulk sulfur content. The results of the analysis in milligrams of $SO_3$ per cm.$^2$ is recorded in Table IV.

For the purposes of comparison a series of polypropylene bottles (Run Nos. $A_1$–$A_5$) identical to the ones employed in the preceding series were treated for various times with various sulfonation agents as set forth hereinafter in Table IV. The bottles had an average thickness of 40 mils. The bottles were thereafter partially filled with 100 cc. of commercial grade regular gasoline. The bottles containing the gasoline were sealed, carefully weighed and stored at 25° C. for periods of 13, 47 and 136 hours with careful reweighing at the end of each time period. The average weight loss after 136 hours is given in grams/day in Table IV.

A similar series of identical polypropylene bottles were treated with sulfonation agents exactly as above and a two-inch square piece was cut out of the one millimeter thick side wall of each bottle and the square pieces were combustion analyzed for bulk sulfur content which data

TABLE III

| Run number | Sulfonating agent | Treatment | Average weight loss, grams/day [a] | | Bulk sulfur content, parts per million | $SO_3$ concentration, milligrams/cm.$^2$ [b] |
|---|---|---|---|---|---|---|
| | | | 5 days | 9 days | | |
| $A_1$* | None | None (control) | 1.764 | 1.713 | <5 | <0.0007 |
| $A_2$* | Sulfur trioxide ($SO_3$) | 0.1% $SO_3$ in TECE [c] for 10 sec. at 25° C | 1.719 | 1.677 | 37 | 0.0056 |
| 1 | do | do [c] | 0.315 | 0.617 | 240 | 0.040 |
| 2 | do | 1.0% $SO_3$ in TECE [c] for 60 sec. at 25° C | 0.637 | 0.658 | 315 | 0.047 |
| 3 | do | 10% $SO_3$ in TECE [c] for 10 sec. at 25° C | 0.172 | 0.196 | 736 | 0.167 |
| 4 | do | 10% $SO_3$ in TECE [c] for 60 sec. at 25° C | 0.117 | 0.134 | 1,200 | 0.180 |
| $A_3$* | Fluorosulfonic acid (F.S.) | 10% F.S. in EA [d] for 300 sec. at 25° C | 1.792 | 1.741 | 38 | 0.006 |
| $A_4$* | Fluorosulfonic acid (F.S.) | 100% F.S. for 300 sec. at 25° C | 1.942 | 1.833 | 13 | 0.002 |
| $A_5$* | do | 100% F.S. for 300 sec. at 50° C | 1.797 | 1.741 | 20 | 0.003 |

[a] Average loss from 3 bottles in grams/day of regular grade gasoline.
[b] Calculated from bulk sulfur content in parts per million (p.p.m.) of sulfur using the formula $C=6.35\times10^{-6}$ AMD wherein C is the surface concentration in milligrams $SO_3$ per cm.$^2$, A is the bulk sulfur content in p.p.m. of sulfur, M is the thickness of the polymer wall in mils (thousandths of an inch), and D is density of polymer in grams per cubic centimeter.
[c] Tetrachloroethylene.
[d] Ethyl acetate.
*Not an example of this invention.

EXAMPLE 14

A series of blow molded polypropylene bottles, (4-ounce capacity), said polypropylene having a density of 0.909 gm./cc. and a melt flow viscosity (230° C., 2.16 kg.) of 0.621 dg./min. were treated for various times with 2 weight percent sulfur trioxide in tetrachloroethylene as set forth on following page in Table IV. The bottles were thereafter partially filled with 100 cc. of the were converted to surface concentration of sulfur trioxide in milligrams per square centimeter by the formula set forth in Example 13. These values are also recorded in Table IV.

A control run ($C_2$) is also carried out in accordance foregoing procedures except that the polypropylene bottle is not sulfonated. The results of this control are also reported in Table IV.

TABLE IV

| Run number | Sulfonating agent | Treatment [a] | Average weight loss, grams/day | $SO_3$ Concentration,[b] milligrams/cm.$^2$ |
|---|---|---|---|---|
| 1 | 2% $SO_3$ in TECE [c] | 1 min | 0.08 | 0.014 |
| 2 | do [c] | 5 min | 0.06 | 0.022 |
| 3 | do [c] | 15 min | 0.02 | 0.022 |
| 4 | do [c] | 30 min | 0.03 | 0.022 |
| $C_2$* | None | None (control) | 1.0 | <0.002 |
| $A_1$* | 2% oleum in TECE [c] | 10 sec. at 25° C | 1.1 | <0.002 |
| $A_2$* | do [c] | 60 sec. at 25° C | 1.0 | <0.002 |
| $A_3$* | 20% sulfuryl chloride in TECE [c] | 10 sec. at 25° C | 1.1 | <0.006 |
| $A_4$* | do [c] | 60 sec. at 25° C | 1.0 | <0.006 |
| $A_5$* | 2% chlorosulfonic acid in TECE [c] | 10 sec. at 25° C | 1.1 | <0.004 |
| $A_6$* | do [c] | 60 sec. at 25° C | 1.0 | <0.002 |
| $A_7$* | Saturated solution of $K_2Cr_2O_7$ in 96% $H_2SO_4$ | 20 sec. at 25° C | 1.1 | <0.002 |
| $A_8$* | do | 60 sec at 25° C | 1.1 | <0.002 |

[a] Only the internal surfaces of the bottles were treated with sulfonating agent.
[b] Accuracy of analysis within ±0.005 milligrams/cm.$^2$.
[c] Tetrachloroethylene.
*Not an example of the invention.

EXAMPLE 15

A series of one gallon high density polyethylene bottles (average internal area of 200 square inches and average wall thickness of 50 mils) were treated on the internal surfaces thereof for various times at room temperature with sulfur trioxide in dry air using concentrations specified in Table V. The bottles were thereafter filled with 750–800 grams of Indolene Motor Fuel #30 and tested for weight loss. The average weight loss of two samples of each run is given in Table V. A similar series of high density polyethylene bottles sulfonated in the foregoing manner were analyzed for bulk sulfur content and the results in mg. $SO_3$ per $cm.^2$ is reported in Table V.

For the purpose of comparison, a control run ($C_4$) wherein the high density polyethylene bottles are not sulfonated is carried out in a similar manner and the results are also recorded in Table V.

TABLE V

| Run Number | $SO_3$ in air, volume percent | Treatment time, min. | $SO_3$ concentration, mg./cm.² | Fuel loss, gms./day |
|---|---|---|---|---|
| $C_4$* | 0 | 0 | 0 | 1.464 |
| 1 | 15.4 | 1½ | 0.035 | 0.020 |
| 2 | 15.9 | 3 | 0.07 | 0.010 |
| 3 | 17.4 | 6 | 0.147 | 0.016 |

*Not an example of the invention.

EXAMPLE 16

A series of one gallon high density polyethylene bottles were internally sulfonated for various times at room temperature with sulfur trioxide in dry air using concentrations specified in Table VI. The bottles were thereafter rinsed with water, dried and partially filled with 750–800 grams of Indolene Motor Fuel #30. The partially filled bottles were tested for weight loss and the results are recorded in Table VI.

For the purposes of comparison, a control run ($C_5$) wherein the high density polyethylene bottle is not sulfonated is carried out in a similar manner and the results are recorded in Table VI.

TABLE VI

| Run No. | $SO_3$ in air, volume percent | Treatment time, min. | Fuel loss rate, gms./day |
|---|---|---|---|
| $C_5$* | 0 | 0 | 1.463 |
| 1 | 15 | 1 | 0.096 |
| 2 | 15 | 1½ | 0.028 |
| 3 | 15 | 3 | 0.031 |
| 4 | 16 | 6 | 0.031 |

*Not an example of the invention.

It is further understood that in the practice of this invention the sulfonate groups which replace hydrogen atoms on the surface or surfaces of the enclosure member may be in salt form wherein the cation of the salt is selected from ammonium, metal ions, substituted quaternary nitrogen groups, and mixtures thereof as disclosed in Ser. No. 770,848. It is also to be understood that the sulfonate groups may exist entirely as sulfonic acid groups, entirely as sulfonate salt groups or as mixture of sulfonic acid groups and sulfonate salt groups. It is therefore understood that for the purposes of this invention, the term "sulfonate groups" as used herein is meant to include sulfonic acid groups, salt forms of sulfonic acid groups and mixtures of sulfonic acid groups and salt forms of sulfonic acid groups.

The sulfonic acid groups which are provided by the sulfonation methods described hereinbefore are readily converted to salt form by contacting said sulfonic acid groups with dilute aqueous solution of alkali metal hydroxide, ammonium hydroxide, gaseous ammonia or other neutralizing agent described in Ser. No. 770,848 which is hereby incorporated by reference in its entirety.

It is further understood that degree of sulfonation as expressed in milligrams (mg.) of sulfur trioxide equivalents per square centimeter will be the same whether the sulfonate groups are in acid or in salt form.

What is claimed is:

1. An enclosure member comprising normally solid, non-aromatic, polymer which consists essentially of a linear carbon-to-carbon backbone structure with non-aromatic substituents, said polymer having a plurality of free hydrogen atoms attached to the carbon atoms thereof, said member having an inner and outer surface, at least one of said surfaces having a portion of hydrogen atoms replaced by sulfonate groups, so that it contains from about 0.015 to about 50 mg. of sulfur trioxide equivalents per square centimeter and is thereby rendered impermeable to the transmission of materials which permeate said polymer in untreated form and a low molecular weight organic penetrant confined within said enclosure member, said penetrant being a material which normally permeates the polymer in untreated form.

2. An enclosure member comprising normally solid, non-aromatic, polymer which consists essentially of a linear carbon-to-carbon backbone structure with non-aromatic substituents, said polymer having a plurality of free hydrogen atoms attached to the carbon atoms thereof, said member having an inner and outer surface, at least one of said surfaces having a portion of hydrogen atoms replaced by sulfonate groups, so that it contains from about 0.015 to about 50 mg. of sulfur trioxide equivalents per square centimeter and is thereby rendered impermeable to the transmission of materials which permeate said polymer in untreated form and a low molecular weight organic penetrant confined within said enclosure member, wherein the organic penetrant is selected from the group consisting of aliphatic hydrocarbon, aromatic hydrocarbon, halogenated aliphatic hydrocarbon, halogenated aromatic hydrocarbon and halogenated alkenyl aromatic hydrocarbon.

3. The enclosure member of claim 2 wherein the organic penetrant is a naphtha derived from petroleum.

4. The enclosure member of claim 2 wherein the organic penetrant is gasoline.

5. The enclosure member of claim 2 wherein the organic penetrant is a lubricating oil.

6. The enclosure member of claim 2 wherein the organic penetrant is a cycloalkane.

7. The enclosure member of claim 2 wherein the organic penetrant is an unsaturated aliphatic hydrocarbon.

8. The enclosure member of claim 2 wherein the organic penetrant is an aromatic hydrocarbon.

9. The enclosure member of claim 2 wherein the organic penetrant is a halogenated aliphatic hydrocarbon.

10. The enclosure member of claim 2 wherein the organic penetrant is a halogenated lower alkane.

11. An enclosure member according to claim 2 substantially impermeable to the transmission of low molecular weight organic material consisting essentially of solid, saturated non-aromatic hydrocarbon polymers which consist essentially of a linear carbon-to-carbon backbone structure with non-aromatic substituents and having a plurality of free hydrogen atoms attached to the carbon atoms, said member having an inner and outer surface, at least one of the said surfaces having a portion of the hydrogen atoms replaced by sulfonate groups, so that it contains 0.06 mg. to 50.0 mg. sulfur trioxide equivalents per square centimeter and is rendered substantially impermeable and a low molecular weight organic penetrant confined within said enclosure member.

12. The enclosure member of claim 2 wherein the polymers are selected from the group consisting of
   (a) homopolymers of ethylene, propylene, isobutylene, butene-1, vinyl chloride, acrylonitrile, and vinylidene chloride,
   (b) chlorinated polyethylene and chlorinated polypropylene,
   (c) interpolymers of the monomers set forth in (a), and
   (d) blends of the foregoing polymers and interpolymers.

13. A substantially impermeable polyethylene enclosure member according to claim 10 having an inner and outer surface, at least one of said surfaces having 0.1 to 10 mg. sulfur trioxide equivalents per square centimeter.

14. A substantially closed organic fluid container resistant to the transmission of hydrocarbons, consisting essentially of solid, saturated, non-aromatic hydrocarbon polymer which has a linear carbon-to-carbon backbone structure with non-aromatic substituents, said polymer having a plurality of free hydrogen atoms attached to the carbon atoms thereof, said container having an inner and outer surface, at least one of said surfaces having a portion of the hydrogen atoms replaced by sulfonate groups, so that at least one of said surfaces contains 0.06 milligram to 50 milligrams of sulfur trioxide equivalents per square centimeter and a hydrocarbon fluid confined within said container.

15. The container according to claim 14 wherein the inner surface thereof is sulfonated.

16. The container according to claim 14 wherein the polymers are selected from the groups consisting of
   (a) homopolymers of ethylene, propylene, isobutylene, butene-1, vinyl chloride, acrylonitrile and vinylidene chloride,
   (b) chlorinated polyethylene and chlorinated polypropylene,
   (c) interpolymers of the monomers set forth in (a), and
   (d) blends of the foregoing polymers and interpolymers.

17. The fluid container of claim 14 wherein the non-aromatic polymer is polyethylene.

18. The fluid container of claim 14 wherein the non-aromatic polymer is polypropylene.

19. An organic fluid container according to claim 14 which contains a low molecular weight hydrocarbon selected from the group consisting of toluene, benzene, cyclohexane, xylene, methyl chloroform, hexane, methane, ethane, propane, butane, gasoline, kerosene, fuel oils, dry cleaning solvents, natural fatty oils, lubricating oils and perfumes.

20. A hydrocarbon fuel tank of non-aromatic hydrocarbon polymer, said tank being substantially impermeable to gasoline and having at least one of the inner and outer surfaces thereof sulfonated to the extent of from about 0.1 to about 1 milligram of sulfur trioxide equivalents in the form of sulfonate groups per square centimeter and hydrocarbon fuel confined therein.

21. The gasoline tank according to claim 20 wherein the inner surface thereof is sulfonated.

22. The tank according to claim 20 wherein the polymer comprises ethylene polymer.

23. The tank according to claim 20 wherein the polymer is polyethylene.

24. The tank according to claim 20 wherein the polymer is polypropylene.

25. The tank according to claim 20 wherein the hydrocarbon fuel is gasoline.

26. A method for containing a low molecular weight organic fluid selected from the group consisting of toluene, benzene, cyclohexane, xylene, methyl chloroform, chloroform, hexane, methane, ethane, propane, butane, gasoline, diesel fuel, kerosene, dry cleaning solvents, fuel oils, natural fatty oils, lubricating oils and perfumes which comprise the steps of (1) sulfonating at least one of the inner and outer surfaces of a container consisting essentially of non-aromatic hydrocarbon polymer to the extent of from about 0.015 to about 50.0 milligrams of sulfur trioxide equivalents per square centimeter and (2) placing said hydrocarbon fluid into the resulting container.

27. The enclosure member of claim 2 wherein the sulfonate groups are sulfonic acid groups.

28. The enclosure member of claim 2 wherein the sulfonate groups are a mixture of sulfonic acid groups and salt forms of sulfonic acid groups.

29. The enclosure member of claim 2 wherein the sulfonate groups are salt forms of sulfonic acid groups.

30. The container of claim 14 wherein the sulfonate groups are sulfonic acid groups.

31. The container of claim 14 wherein the sulfonate groups are a mixture of sulfonic acid groups and salt forms of sulfonic acid groups.

32. The container of claim 14 wherein the sulfonate groups are salt forms of sulfonic acid groups.

33. The fuel tank of claim 20 wherein the sulfonate groups are sulfonic acid groups.

34. The fuel tank of claim 1 wherein the sulfonate groups are a mixture of sulfonic acid groups and salt forms of sulfonic acid groups.

35. The fuel tank of claim 1 wherein the sulfonate groups are salt forms of sulfonic acid groups.

36. An enclosure member comprising normally solid, non-aromatic, polymer which consists essentially of a linear carbon-to-carbon backbone structure with non-aromatic substituents, said polymer having a plurality of free hydrogen atoms attached to the carbon atoms thereof, said member having an inner and outer surface, at least one of said surfaces having a portion of hydrogen atoms replaced by sulfonate groups, so that it contains from about 0.015 to about 50 mg. of sulfur trioxide equivalents per square centimeter and is thereby rendered impermeable to the transmission of materials which permeate said polymer in untreated form and a low molecular weight organic penetrant wherein said penetrant is selected from the group consisting of paraffins, naphthas derived from petroleum and coal tars, fuel oils, lubricating oils and greases. cycloalkanes, monoolefins, diolefins, alkynes, benzene, toluene, xylene, naphthalene, styrene, vinyltoluene, t-butyl-styrene, α-methylstyrene, methyl chloride, methyl bromide, methylene chloride, chloroform, bromoform, carbon tetrachloride, carbon tetrabromide, methylchloroform, ethyl chloride, 1,1-dichloroethane, 1,2-dichloroethane, 1,1,2-trichloroethane, 1,1,1,2-tetrachloroethane, 1,1,2,2-tetrachloroethane pentachloroethane, hexachloroethane, methylenechlorobromide, propylene dichloride, 1,1,2,2-tetrachloro-1,2-difluoroethane, 1,1,2-trichloro-1,2,2-trifluoroethane, 1,2 - dibromo - 1,1,-2,2-tetrafluoroethane, carbon trichlorofluoride, dichlorofluoromethane, octafluorocyclobutane, 1,2-dichloro-1,1,2,2-tetrafluoroethane, carbon tetrafluoride, trifluoromethane, carbon dichlorodifluoride, chloropentafluoroethane, chlorodifluoromethane, bromotrifluoromethane, hexafluoroethane, 1,1,1-chlorodifluoroethane, and 1,1-difluoroethane, vinyl chloride, vinylidene chloride, vinyl bromide, vinyl fluoride, vinylidene fluoride, chlorobenzene, bromobenzene, chlorotoluene, benzyl chloride, benzyl bromide, dichlorobenzene, trichlorobenzene, chlorostyrene, bromostyrene, dichlorostyrene, vinyl benzyl chloride, citrus oil, clove oil, eugenol, isoeugenol, ionone, orange oil, lemon oil, mineral oil and vegetable oil.

37. The enclosure member of claim 2 wherein the penetrant is vinyl benzyl chloride.

References Cited

UNITED STATES PATENTS

| | | | |
|---|---|---|---|
| 2,793,964 | 5/1957 | Gilbert et al. | 117—33.3 |
| 3,613,957 | 10/1971 | Walles | 220—64 |
| 2,985,542 | 5/1961 | Pinsky et al. | 117—95 X |
| 2,836,319 | 5/1958 | Pinsky et al. | 215—1 C |

FOREIGN PATENTS

| | | | |
|---|---|---|---|
| 879,595 | 10/1961 | Great Britain | 117—138.8 |

EDWARD G. WHITBY, Primary Examiner

U.S. Cl. X.R.

117—95, 138.8 E, 138.8 UA, 169 R; 206—84; 220—64; 260—79.5 NV

UNITED STATES PATENT OFFICE
CERTIFICATE OF CORRECTION

Patent No. 3,740,258  Dated June 19, 1973

Inventor(s) Wilhelm E. Walles

It is certified that error appears in the above-identified patent and that said Letters Patent are hereby corrected as shown below:

Column 8, line 2, the word "Pflow" should be --flow--.

Column 10, in Table IV, several errors have occurred under the last heading "$SO_3$ Concentration milligrams/$cm^2$"

The errors occur in the 2nd, 3rd, 4th, 8th, 9th and 10th lines. Corrected column is shown below:

```
    --          0.014
                0.026
                0.026
                0.024
               <0.002
               <0.002
               <0.002
               <0.002
               <0.002
               <0.002
               <0.002
               <0.002

<0.002       --
```

Signed and sealed this 18th day of December 1973.

(SEAL)
Attest:

EDWARD M. FLETCHER, JR.
Attesting Officer

RENE D. TEGTMEYER
Acting Commissioner of Patents